(12) United States Patent
Zhao et al.

(10) Patent No.: US 9,317,487 B1
(45) Date of Patent: Apr. 19, 2016

(54) EXPANSION OF HIGH PERFORMING PLACEMENT CRITERIA

(75) Inventors: Gaofeng Zhao, Santa Clara, CA (US); Claire Cui, Palto Alto, CA (US); Hui Tan, Cupertino, CA (US); Bahman Rabii, San Francisco, CA (US); Wei Chai, Union City, CA (US)

(73) Assignee: Google Inc., Mountain View, CA (US)

( * ) Notice: Subject to any disclaimer, the term of this patent is extended or adjusted under 35 U.S.C. 154(b) by 542 days.

(21) Appl. No.: 13/532,335

(22) Filed: Jun. 25, 2012

(51) Int. Cl.
*G06F 17/00* (2006.01)
*G06F 17/22* (2006.01)
*G06Q 30/02* (2012.01)

(52) U.S. Cl.
CPC ........ *G06F 17/2247* (2013.01); *G06Q 30/0253* (2013.01); *G06Q 30/0277* (2013.01)

(58) Field of Classification Search
CPC ............ G06F 17/212; G06F 17/30861; G06F 17/30867; G06Q 30/0251; G06Q 30/0253; G06Q 30/0277
USPC .......................................... 715/243, 253, 738
See application file for complete search history.

(56) References Cited

U.S. PATENT DOCUMENTS

| 7,725,464 | B2 | 5/2010 | Grubb et al. | |
|---|---|---|---|---|
| 2005/0071325 | A1* | 3/2005 | Bem | 707/3 |
| 2005/0144064 | A1 | 6/2005 | Calabria et al. | |
| 2007/0100803 | A1* | 5/2007 | Cava | 707/3 |
| 2008/0288328 | A1 | 11/2008 | Minor et al. | |
| 2009/0132334 | A1 | 5/2009 | Wang et al. | |
| 2009/0171749 | A1* | 7/2009 | Laruelle et al. | 705/10 |
| 2009/0265243 | A1 | 10/2009 | Karassner et al. | |
| 2010/0082431 | A1* | 4/2010 | Ramer et al. | 705/14.52 |
| 2010/0287134 | A1* | 11/2010 | Hauser | 706/54 |
| 2011/0270672 | A1 | 11/2011 | Hillard et al. | |
| 2012/0130804 | A1* | 5/2012 | Guo et al. | 705/14.46 |

* cited by examiner

*Primary Examiner* — Scott Baderman
*Assistant Examiner* — Matthew G McVicker
(74) *Attorney, Agent, or Firm* — Fish & Richardson P.C.

(57) ABSTRACT

Systems and methods of evaluating information in a computer network environment are provided. A data processing system can obtain or receive a content placement criterion, such as a keyword, associated with a content item and can determine a quality metric of the content placement criterion. The data processing system can identify a candidate content placement criterion and expand placement criteria associated with the content item to include the content placement criterion and the candidate content placement criterion based at least in part on an evaluation of the quality metric of the content placement criterion. The data processing system can expand placement criteria based in part on a throttling parameter. The data processing system can identify a correlation between a document and the placement criteria to identify appropriate content items for the document.

20 Claims, 4 Drawing Sheets

EXPANSION OF HIGH PERFORMING PLACEMENT CRITERIA

BACKGROUND

In a networked environment such as the Internet, it is often desirable to pair one or more documents with a requested document, such as a web page. A document viewer's experience may be enhanced by content that is of interest to the viewer. For example, a requested web page may be displayed along with one or more additional content items. The content can be selected based on a variety of criteria, often with the end goal of soliciting a user reaction such as exploration of the content via a click-through.

SUMMARY

Aspects and implementations of the present disclosure are directed to systems and methods of evaluating information in a computer network environment. A data processing system can obtain or receive a content placement criterion, such as a keyword, associated with content items and can determine a quality metric of the content placement criterion. The data processing system can identify a candidate content placement criterion and expand placement criteria associated with the content item to include the content placement criterion and the candidate content placement criterion based at least in part on an evaluation of the quality metric of the content placement criterion. The data processing system can expand placement criteria based in part on a throttling parameter. The data processing system can identify a correlation between a document and the placement criteria to identify one or more appropriate content items for the document. Content items may include text, images, and media elements such as an image, video, or interactive feature (e.g., a game).

A content provider may provide content items to be delivered with documents from content publishers. In some implementations, the placement system determines what content items to deliver based on placement criteria. In some implementations, successful placement criteria used to place a content item are expanded to include additional placement criteria derived from a successful placement criterion.

At least one aspect is directed to a computer-implemented method of evaluating information in a computer network environment by obtaining a content placement criterion associated with a content item; determining a quality metric of the content placement criterion; identifying a candidate content placement criterion; and expanding placement criteria associated with the content item to include the content placement criterion and the candidate content placement criterion based at least in part on an evaluation of the quality metric of the content placement criterion. In some implementations, where the quality metric is based on a click through rate, the method further includes determining the click through rate of the content placement criterion corresponding to the content item.

At least one aspect is directed to a system of providing information via a computer network, the system including a data processing system having at least one of a content placement module and a quality metric module, the data processing system configured to receive a content placement criterion associated with a content item; determine a quality metric of the content placement criterion; identify a candidate content placement criterion; and expand the placement criteria associated with the content item to include the content placement criterion and the candidate content placement criterion based at least in part on the quality metric of the content placement criterion.

At least one aspect is directed to a computer readable storage medium having instructions to provide information on a computer network, the instructions including instructions to receive a content placement criterion associated with a content item; determine a quality metric of the content placement criterion; identify a candidate content placement criterion; and expand the placement criteria associated with the content item to include the content placement criterion and the candidate content placement criterion based at least in part on an evaluation of the quality metric of the content placement criterion. In some implementations the instructions include instructions to determine a throttling parameter of the content item and expand the content placement criterion to include the candidate content placement criterion based on an evaluation of the throttling parameter.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods of, apparatuses for, and systems for expanding keywords to include high performing keywords. The various concepts introduced above and discussed in greater detail below may be implemented in any of numerous ways, as the described concepts are not limited to any particular manner of implementation. Examples of specific implementations and applications are provided primarily for illustrative purposes.

A content provider such as a content sponsor may provide content items to be delivered with documents from primary content publishers. When a web page or other document is requested, e.g., by a user, a content placement system can determine one or more content items to present with the document. In some implementations, the placement system determines what content item or items to deliver based on placement criteria. For example, the placement system may identify a correlation between the document and a placement criterion associated with a content item and select that content item for delivery. One example of a placement criterion is a keyword. A content item may include text, images, and media elements such as an image, video, or interactive feature (e.g., a game). Content items may provide information enhancing other content within a document, e.g., primary content. Content items may be related to the primary content (e.g., behind-the-scenes media), include material related to the source of the primary content (e.g., highlights of other content from the source), include material that may be of interest to the user based on user-related factors (e.g., a relevant weather report), provide offers for the user to participate in a transaction, or provide media elements such as a video player or interactive game.

In some implementations, a placement criterion is successful and leads to the placement of a content item with a web page where the viewer of the web page is likely to respond to the content item. The placement criteria can also be expanded, e.g., from criteria originally provided from the content provider to the content placement system, to include additional placement criteria. The additional placement criteria can be derived from the successful placement criterion. In some implementations, the content item is part of a content group where the placement criteria are affiliated with the group as a whole. In this example, successful placement criteria for a content item from the content group may be expanded to include additional placement criteria for additional content items or other content in the group.

Figure 1:
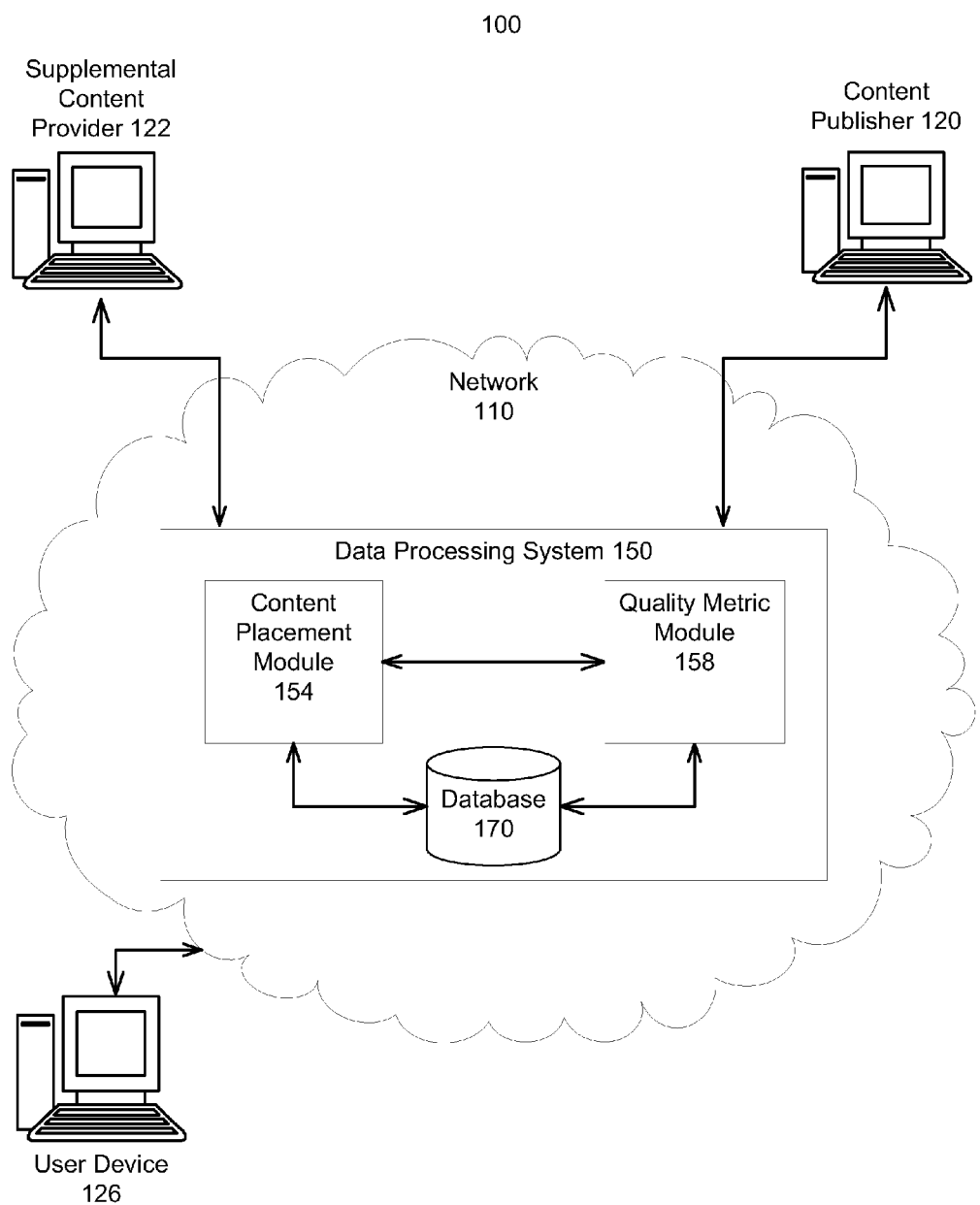
FIG. 1 is a block diagram depicting an example environment to evaluate information on a computer network, according to an illustrative implementation.

FIG. 1 illustrates an example system 100 for providing content to a user device 126 via a computer network such as network 110 according to an implementation of the present disclosure. The network 110 can include computer networks such as the Internet, local, metro, or wide area networks, intranets, and other communication networks such as mobile telephone networks. The network 110 can be used to access web pages that can be displayed on at least one user device 126, such as a laptop, desktop, tablet, personal digital assistants, smart phones, or portable computers. For example, via the network 110 a user of user device 126 can access web pages provided by a content publisher 120. In this example, the user device 126 uses software, such as a web browser, to access a web server and retrieve a web page for display on a monitor of the user device 126. The web server may be the content publisher 120 or an intermediary host.

The system 100 includes at least one data processing system 150 that, for example, can include at least one processor or other logic device to communicate via the network 110 with at least one content publisher 120 and at least one supplemental content provider 122. In one implementation, the data processing system 150 includes a content placement system configured to evaluate and include candidate keywords as placement criteria used to place content items with web pages or other documents via the network 110. The data processing system 150 can also include at least one content placement module 154, at least one quality metric module 158, and at least one data repository or database 170. The data processing system 150 can include or communicate with a content selection server, a content host server, a content placement server, and other data processing systems.

In some implementations, the data processing system 150 includes an interface configured to receive a request via the network 110 to identify content items for delivery with a web page. The data processing system 150 may receive the request in real-time, e.g., after the user device 126 requests access to a web page and before the web page is fully rendered on the user device 126. The activity of users on the network 110, e.g., requests for a web page, can be maintained in an anonymous fashion such that individual users cannot be identified from the maintained user activity. Furthermore, user activity information can be collected on an opt-in or opt-out basis. Users can control the collection of their activity information. The user can be represented by identifiers associated with the user device 126, for example using a cookie, without regard to the actual identity of the individual person accessing the user device 126. Identifiers may be selected containing no personally-identifiable information about the user or the user device 126, for example, a random number may be used. In some implementations, a user may affirmatively opt to provide personally identifying information such as a name, nickname, e-mail address, or other identifying feature to the data processing system 150. In some implementations, a user may benefit without providing any such personally identifying information to the data processing system 150.

Figure 2:
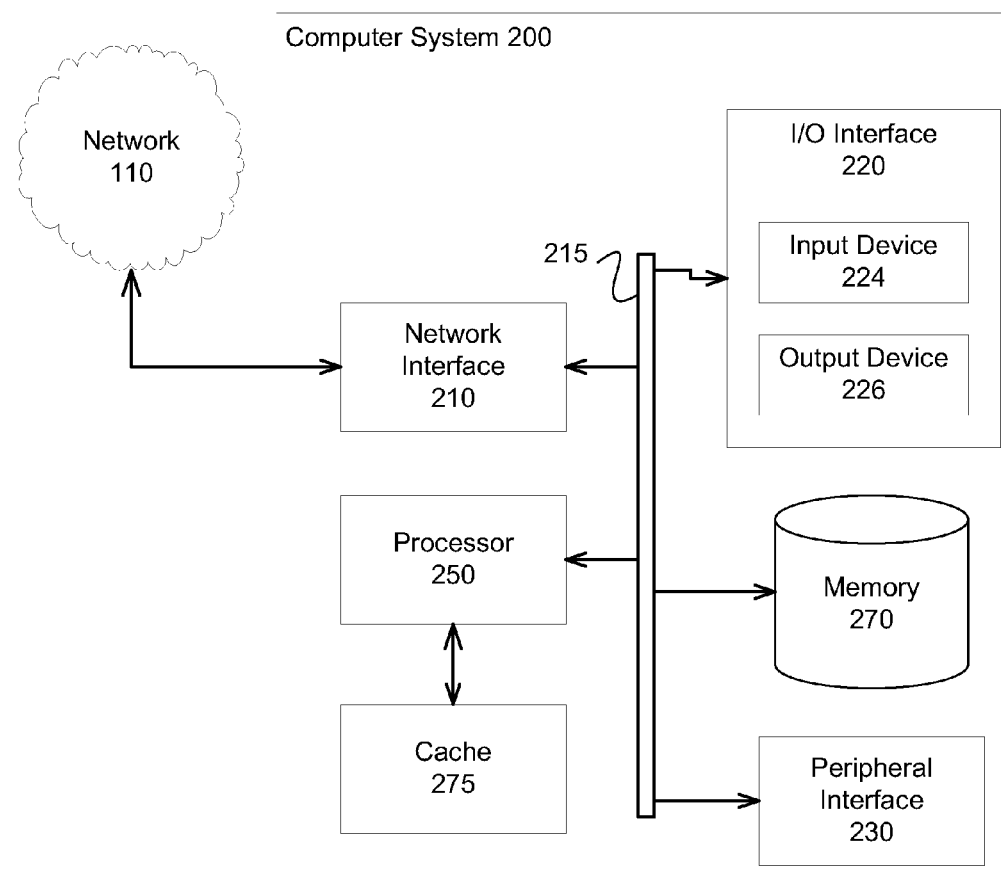
FIG. 2 is a block diagram illustrating a general architecture for a computer system that may be employed to implement various elements of the systems and methods described and illustrated herein, according to an illustrative implementation.

FIG. 2 is a block diagram of a general architecture of an illustrative computer system 200. In some implementations, the data processing system 150 of FIG. 1 includes the computer system 200. For example, the content placement module 154 or the quality metric module 158 can each be part of at least one computer system 200. The example computer system 200 includes one or more processors 250 in communication, via a bus 215, with one or more network interfaces 210 (in communication with the network 110), I/O interfaces 220 (for interacting with the user), and internal memory 270. In some implementations, a processor 250 incorporates, or is directly connected to, additional cache memory 275. In some implementations, additional components are in communication with the computer system 200 via a peripheral interface 230. In some implementations, such as a server, there is no I/O interface 220, or the I/O interface 220 is not used. The computer system 200 of FIG. 2 may be employed to implement the systems and methods discussed herein.

In some implementations, the user device 126 includes a computer system 200. For example, a user can interact with an input device 224, e.g., a keyboard, mouse, or touch screen, to request a web page to be delivered over the network 110, received at interface 210, and output via output device 226, e.g., a display, screen, touch screen, or speakers. The request can be processed by the data processing system 150, which may include a computer system 200, for example to identify content items from content provider 122 for delivery with content from content publisher 120 based on placement criteria.

When a web page is requested by a user device 126, a content placement system, e.g., data processing system 150, determines one or more content items to present with the requested web page. In some implementations, the placement system determines what content items to deliver based on placement criteria.

A placement criterion, such as a keyword, can include more than one term, component, number, or word. The placement criteria can include at least one keyword used by the data processing system to match the content item with a web page (or other document). One placement criterion can include a phrase having more than one word, e.g., "BrandName Product." In an example usage, the data processing system 150 receives notification of a request for access to a web page. The data processing system 150 can compare the placement criteria with features of the web page, including the title, content, or metadata, and determine if the content item associated with the criteria should be provided for display with the web page. For example, in some implementations, the placement criteria may be the words "BrandName Product" and a placement server of the data processing system 150 is configured to place an associated content item on a page that includes both "BrandName" and "Product."

In some implementations, the placement system, e.g., data processing system 150, determines what content item to deliver with a particular document or web page based on a plurality of placement criteria associated with a plurality of content items. For example, the document can be parsed into a set of tokens. The tokens may be compared with the placement criteria to identify associated content items. The placement criteria may be expanded to include additional placement criteria. The placement system may determine the content item or items to deliver based on original placement criteria or the expanded additional placement criteria.

In some implementations, the set of tokens parsed from the document may be filtered to determine a sub-set of useful tokens for selecting content items. In some implementations, the set of tokens may be expanded, in a manner similar to that described for placement criteria, to include additional tokens related to one or more of the tokens. The placement system, e.g., data processing system 150, may use the set of tokens, or the set of expanded tokens, in determining the content item or items to deliver with the document.

Figure 3:
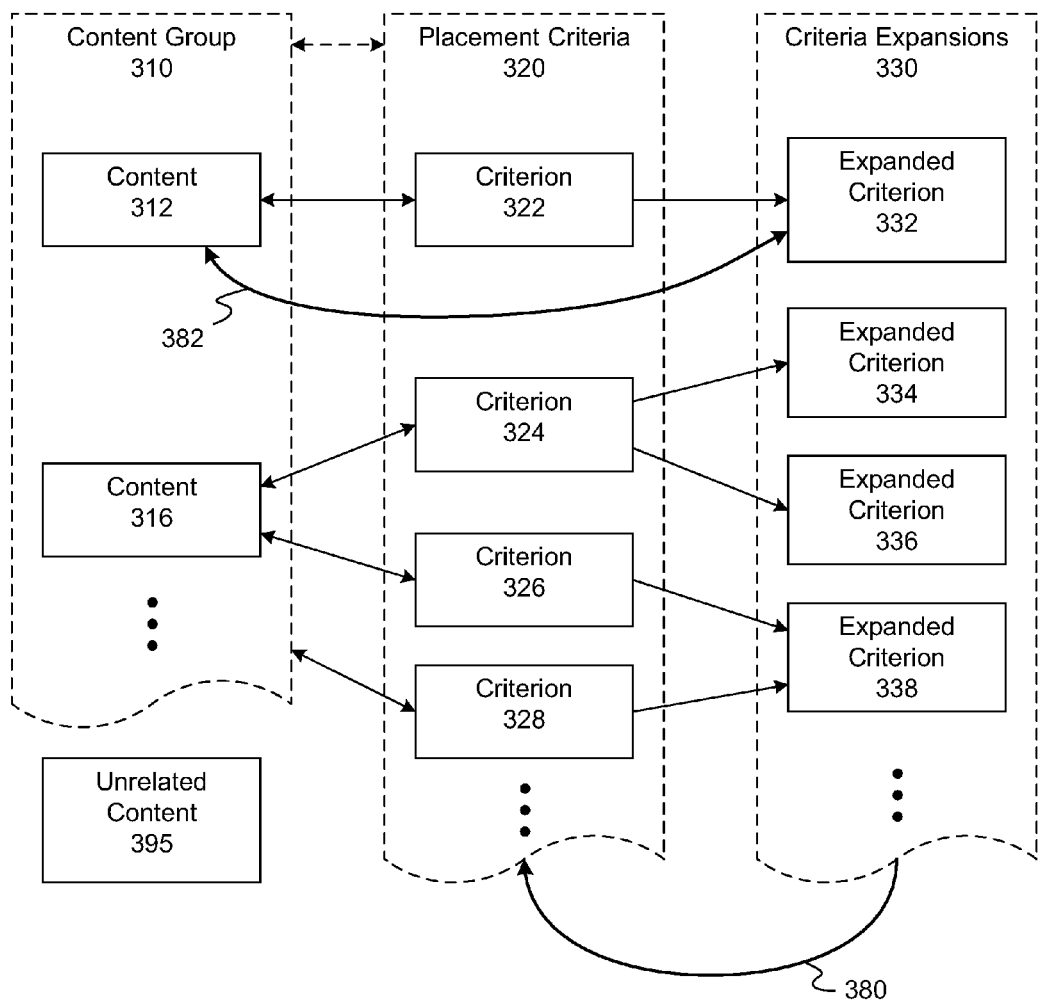
FIG. 3 is a block diagram depicting relationships between information, according to an illustrative implementation.

FIG. 3 illustrates example relationships 300 between content items and placement criteria. In some implementations, content 312 is associated with a criterion 322. Content may also be associated with multiple criteria. For example, content 316 in the example of FIG. 3 is associated with a first criterion 324 and a second criterion 326. In some implementations, content may be grouped. For example, content 312 may be grouped with similar or related content 316 into a content group 310. The content group 310 may constitute a group of content items and can exclude some content, e.g., unrelated content 395. The group 310 may be associated with at least one placement criterion. The constituent content of the group 310 may be individually associated with respective criteria or, in some implementations, the content group 310 may be associated with a group of placement criteria 320.

The placement criteria 320 can be expanded by the data processing system 150 to include the criterion 322 and at least one expanded criterion 332. In this example, the expanded criterion 332 may be associated with the original criterion 322. In some implementations, the expanded criterion 332 is associated (e.g., as represented by identifier 382) with the content 312. In this example, the placement criteria associated with the content 312 is expanded to include both the criterion 322 (e.g., received at the data processing system 150 from the supplemental content provider 122) and the expanded criterion 332 (e.g., determined by the data processing system 150).

The expanded criterion 332 can be added (as indicated by identifier 380) to the placement criteria 320 for the content 312 or for the content group 310. In some implementations, a criterion is expanded to multiple criteria, for example a criterion 324 can be expanded to a first expanded criterion 334 and a second expanded criterion 336. In some implementations, multiple placement criteria are expanded into a single expanded criterion. For example, a first placement criterion 326 and a second placement criterion 328 can be evaluated by the data processing system 150 to generate an expanded criterion 338. These are examples of relationships between content. The contents of content group 310, placement criteria 320, and criteria expansions 330, can include various forms of content, content groups, or keywords or other placement criteria having other relationships.

In some implementations, original placement criteria are expanded to include additional criteria when the original placement criteria are determined to be of sufficient quality with respect to their associated content. For example, the data processing system 150 can determine that a placement criterion is successful if it leads to the placement of content items with a web page where the viewer of the web page is likely to respond to one of the content items. In some implementations, the data processing system 150 can predict or estimate the value of a placement criterion by determining at least one quality metric of the placement criterion. For example, the quality metric module 158 can determine a click through rate (or other performance trend) of a placement criterion. In some implementations, placement criteria already associated with a content item are expanded to include a candidate content placement criterion when the quality metric for the placement criteria already associated with the content item exceeds a threshold such as a sufficiently high click through rate (CTR).

In one example of using a quality metric based on a click through rate (CTR), the CTR can be generated by evaluating the historical click through rate of content items placed on web pages due to a correlation between a keyword or other placement criterion and the content of those web pages. The content items used in generating a CTR may be selected from a content group rather than all available content items. For example, the quality metric can be based on historical performance of a placement criterion 322 (e.g., a keyword) relative to its corresponding content item 312 or content group 310, as opposed to a more generic quality metric of keyword performance relative to other content such as different content items, e.g., content 316, or content items that are not part of the content group such as unrelated content 395. The content group may be based on similarity of product, content, sponsor, genre, or any other classification scheme. A content group may be formed through an automated process, by a specialist, or even by specification from the content item's source. A quality metric based on CTR may also take into account additional analysis based on statistical models to infer user behavior. Quality metrics based on CTR generally estimate if a keyword is useful, for example, that a user is likely to click on a content item placed on a web page due to a correlation with that keyword. Other quality metrics, such as a metrics based on click through volume, can also be used to predict the value of candidate placement criteria such as keywords.

With reference to FIGS. 1-3, in some implementations the data processing system 150 obtains at least one content placement criterion (e.g. placement criterion 322). The data processing system 150 can obtain the content placement criterion from the supplemental content provider 122 or from the database 170, for example. The content placement criterion can include a keyword or other placement criteria associated with a content item, content group, or other content. The content placement module 154 can use the placement criteria to match its associated content item with a web page, and the content item can be provided for display with the web page at the user device 126.

In one implementation, the data processing system 150 determines a quality metric of the content placement criterion. For example, the quality metric module 158 can determine the click through rate of the content placement criterion relative to its associated content item. The same keyword may have different click through rates (or other quality metrics) for various content items. For example, a keyword may be highly effective for placing one content item, but the same keyword can be ineffective when used to place a different content item. In one implementation, the data processing system 150 determines a quality metric for the content placement criterion relative to corresponding content.

For example, the data processing system 150 can obtain, e.g., from the supplemental content provider 122, the keyword "tropical beach vacations" associated with a particular content item (or group of content items) for an exclusive Caribbean resort. In this example, the data processing system 150 can determine the click through rate of the keyword "tropical beach vacations" relative to the particular content item for the Caribbean resort.

The data processing system 150 can also identify at least one candidate content placement criterion (e.g., criteria expansions 330). The candidate content placement criteria can be derived from the obtained placement criteria that are associated with the content item. For example, from the placement criterion "tropical beach vacations" the data processing system 150 can identify the candidate placement criteria "beach vacations" "tropical beach" "beach holiday" "island getaway" or "honeymoon destination". The candidate placement criteria generally include keywords, terms, or other criteria that may be used to assist with placement of the content item associated with the (e.g., original) placement criteria. The candidate placement criteria (e.g., "beach vacations") can be terms of the original placement criteria (e.g., "tropical beach vacations") or different terms having a degree of semantic or subject matter similarity with the original placement criteria (e.g., "beach holiday" since "holiday" is sometimes synonymous with "vacation").

In some implementations, the data processing system 150 expands criteria associated with the content to include the candidate content placement criterion. For example, the data processing system 150 can evaluate the quality metric of the placement criterion associated with the content item, and can associate the candidate content placement criterion with the content item when the quality metric of a placement criterion already associated with the content item satisfies a threshold. For example, the candidate placement criterion can be added to placement criteria of the content item when the click through rate of the placement criterion relative to its associated content item is above a threshold level.

With reference to the above example, when the click through rate of the keyword "tropical beach vacations" relative to the particular Caribbean resort content item is above a threshold percentage, the data processing system 150 can expand placement criteria for the Caribbean resort content item to include at least one candidate keyword such as "beach holiday" or "island getaway" in addition to the criterion "tropical beach vacations". In this example, the content placement module 154 can use any of these criteria to place the Caribbean resort content item on a web page via the network 110 for display at the user device 126.

In some implementations, the data processing system 150 determines a throttling parameter of the content, and expands the placement criteria of the content item based at least in part on the throttling parameter. The throttling parameter can be based on a monetary budget for content item placement. For example, an entity associated with the data processing system 150 or the content publisher 120 may charge the supplemental content provider 122 a fee to place content items on web pages. Excessive content placement may prematurely exhaust the budget.

The data processing system 150 can determine that the budget for placement of a content item is insufficient, or is being depleted at a sufficiently high rate that expanding the placement criteria to include additional criteria is not warranted. In this example, the data processing system 150 can exclude a candidate content placement criterion from association with content in order, for example, to conserve the budget dedicated to placement of that content item. In one implementation, the candidate placement criterion can be excluded despite the quality metric of the (e.g., original) placement criteria having a high click through rate or otherwise satisfying a quality metric threshold. In some examples, the data processing system 150 determines that a budget (or other throttling parameter) is sufficient and proceeds to associate candidate placement criteria with the content item.

Figure 4:
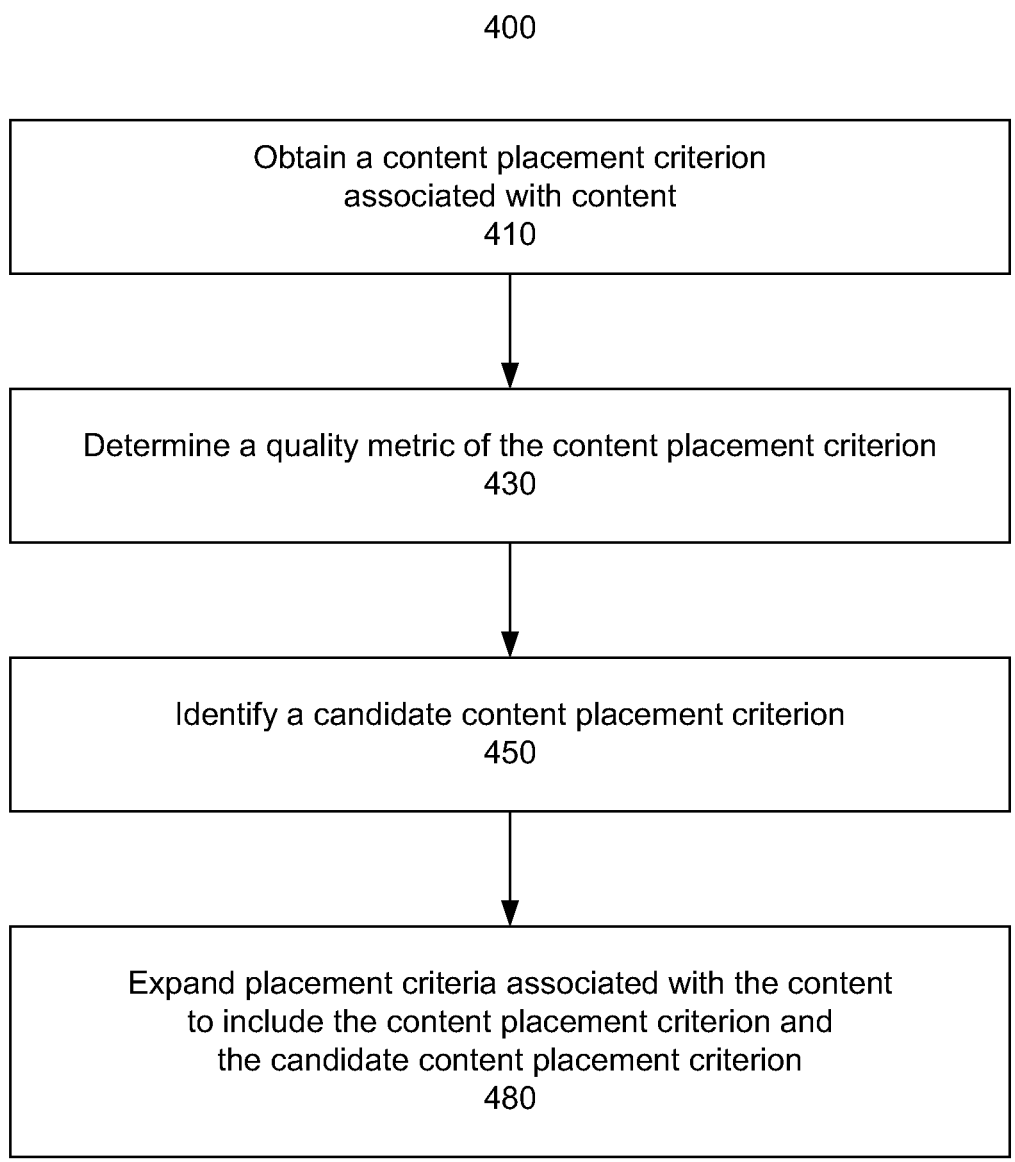
FIG. 4 is a flow diagram depicting a method of evaluating information in a computer network.

FIG. 4 is a flow chart illustrating an example method 400 for expanding placement criteria. In some implementations, the method 400 obtains at least one content placement criterion associated with content (410) and determines a quality metric of the content placement criterion (430). In some implementations, the method 400 identifies a candidate content placement criterion (450), for example, by expanding the obtained criterion. In some implementations, the method 400 expands the placement criteria associated with the content to include the content placement criterion and the candidate content placement criterion (480).

In some implementations, the method 400 expands the placement criteria associated with the content to include the candidate content placement criterion (480) when the determined quality metric of the content placement criterion (430) indicates a valuable or successful placement criterion. In some implementations, additional parameters are considered. For example, in some implementations, a throttling parameter can be used to limit criteria expansion.

Accordingly, in some implementations, determining a quality metric of the content placement criterion (430) includes an analysis of the criterion and the objectives of the content item's source. One example of a quality metric is a click through rate (CTR), as discussed above. Other quality metrics, such as a click through volume, can also be used to predict the value of candidate placement criteria such as keywords. A quality metric may be a composite, e.g., a CTR adjusted by additional metric parameters. For example, the additional metric parameters may be a weight reflecting the frequency a candidate placement criterion is used in placing content items or the frequency a candidate placement criterion occurs in documents with which content items may be delivered.

In some implementations, when the original placement criteria are sufficiently effective, the placement criteria specified by the content provider may be expanded. A criteria expansion system can generate a set of expanded criteria from one or more of the original placement criteria specified by the content provider. For example, an original criterion for a content item highlighting a BrandName product may be the keyword "BrandName Product." From this placement criteria, the expanded criterion "BrandName" can be derived. This expanded criterion can be used in comparisons with web page content to place the content item corresponding to the "BrandName Product" criterion.

In some implementations, expansion of an original placement criterion may be performed in an automated manner through phrase parsing (e.g., using a subset of words found in the criterion or keyword), dictionary substitution (e.g., using synonyms), brand correlation substitution (e.g., using a table of model names for a BrandName product), or semantic similarity, for example. In some implementations, criterion expansion can be performed manually. For example, a specialist may have additional placement criterion suggestions not supplied by the content item's source. An expanded criterion may, but need not, include elements from the original criterion, such as terms of a multi-term keyword. Expanded criteria can be stored in a repository (e.g., a database) and retrieved to assist with placement of content associated with the original placement criterion.

In some situations, it may be useful to vary or restrict the use of expanded placement criteria. For example, the click through rate of a content item might not be improved by expanding an ineffective original placement criterion, e.g., where the determined quality metric of the original content placement criterion (430) is below some threshold value. In one example, if the CTR of the original placement criterion is low, then the candidate placement criterion might not be used to supplement the original criterion. (Because in this example, the original keyword is not very good if it has a low CTR, so it is generally not beneficial to add a similarly ineffective expanded keyword to expand an ineffective original keyword). If the CTR is high, then the candidate placement criterion can be used to supplement the original placement criterion for content item placement. The expanded placement criterion can be used to complement the original placement criterion when the CTR of the original placement criterion for its corresponding content is sufficiently high. High and low CTR can be determined by comparison with a threshold value, for example.

In another example, expanded placement criteria may be overly successful. A content item provider (e.g., a sponsor) may wish to control the number of presentations for a content item (e.g., using a throttling parameter) to maintain a preferred click through rate. A sponsor may want to limit the CTR for a number of reasons including sponsorship budget, load balancing for a landing server, or other limitations (e.g., the content item includes an offer of a special deal for a fixed number of participants). In these examples, the data processing system can determine if expanded placement criteria should be added to the original placement criteria.

For example, a sponsor can provide a maximum budget to be spent for content item placement, where the data processing system deducts a certain amount from that budget each time the corresponding content item is placed on a web page. Placement criterion expansion may be restricted by use of a throttling parameter to block candidate placement criteria and conserve the budget, or when the budget is exhausted. For example, if a content item is running out of budget, then expansion can be reduced or otherwise restricted. This generally prevents the content item from being placed on a web page based on anything other than a match with the original criterion provided by the sponsor. The expanded criteria can be used to complement the original criteria when the budget for content item placement is sufficiently high, e.g., above a threshold value.

FIG. 2, as introduced above, is a block diagram of a general architecture of an illustrative computer system 200, as discussed above. The computer system or computing device 200 may be employed to implement any of the computer systems discussed herein, in accordance with some implementations, including implementation of the system 100, content publisher 120, supplemental content provider 122, user device 126, data processing system 150, content placement module 154, quality metric module 158, database (or repository) 170, and any other computer system used. The computer system 200 can be used to provide information via the network 110 and to evaluate data, e.g., to determine a quality metrics of a criterion, to expand placement criteria, and to use the expanded placement criteria to identify content to provide for display with a web page.

The computer system 200 of FIG. 2 can include one or more processors 250 communicatively coupled to memory 270 and one or more communication or network interfaces 210. Generally, the computer system 200 includes an I/O interface for receiving input via one or more input devices 224 (e.g., a keyboard, mouse, or touch screen) and producing output to one or more output devices 226 (e.g., a display, a screen, a touch screen, or speakers). The processors 250 can be included in the data processing system 150 or the other components of the system 100 such as the content placement module 154 or the quality metric module 158.

In the computer system 200 of FIG. 2, the memory 270 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 100 of FIG. 1, the content placement module 154, the quality metric module 158, or the database 170 can include the memory 270 to store quality metrics, selection criteria, or content. The processor(s) 250 shown in FIG. 2 may be used to execute instructions stored in the memory 270 and, in so doing, also may read from or write to the memory 270, and to cache 275, various information processed and or generated pursuant to execution of the instructions.

The processor 250 of the computer system 200 shown in FIG. 2 also may be communicatively coupled to or control the communication or network interface(s) 210 to transmit or receive various information pursuant to execution of instructions. For example, the network interface(s) 210 may be coupled to a wired or wireless network, bus, or other communication means and may therefore allow the computer system 200 to transmit information to and/or receive information from other devices (e.g., other computer systems). While not shown explicitly in the system of FIG. 1, one or more communications interfaces facilitate information flow between the components of the system 100. In some implementations, the communications interface(s) may be configured (e.g., via various hardware components or software components) to provide a website as an access portal to at least some aspects of the computer system 200.

The input device(s) 224 may be provided, for example, to allow a user to make manual adjustments, make selections, enter data or other information, or interact in any of a variety of manners with the processor during execution of the instructions. The output devices 226 of the computer system 200 shown in FIG. 2 may be provided, for example, to allow information to be viewed or otherwise perceived in connection with execution of the instructions. The input device 224 and the output device 226 may be the same device, such as a touch screen interface.

The processor 250 of the computer system 200 shown in FIG. 2 also may be communicatively coupled to one peripheral interface(s) 230, e.g., a USB device, memory, disk drive, printer, or media device (e.g., a CD, DVD, or Blu-Ray player). Peripherals may be external to the computer system 200, separated by an interface (e.g., a USB interface) or housed within the computer system 200 and more closely connected, (e.g., a small computer system interface ("SCSI") hard-disk drive).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., NETFLIX™, VUDU™, HULU™, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, digital pad, tablet PC, or other computing device.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. In some implementations, the content placement module 154 and the quality metric module 158 are special purpose logic circuits, e.g., application-specific integrated circuits (ASICs). In some implementations, the modules include one or more processors executing instructions encoded as firmware or software on communicatively coupled computer readable media. In some implementations, the modules can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non volatile memory, media and memory devices, including by way of example semiconductor memory devices, e.g., erasable programmable read-only memory ("EPROM"), electrically erasable programmable read-only memory ("EEPROM"), and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a LCD (liquid crystal display) monitor, light-emitting diode "LED" or organic light-emitting diode ("OLED") screen, a CRT (cathode ray tube), a plasma screen, or a projector, for displaying information to the user and a touch screen, keyboard, or a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 200 or system 100 can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In some implementations, the systems and methods of the disclosure can restrict keyword expansion for a content item based on a determined CTR of the original keyword for that content item. In some implementations, the systems and methods of the disclosure can restrict keyword expansion for a content item based on a budget allotted to the content item. In some implementations, placement criteria other than a keyword may be used and expanded as shown.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements. References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method of evaluating information in a computer network environment, comprising:

obtaining, by a quality metric module executing on one or more processors of a data processing system, a keyword used to place an advertisement, the keyword obtained from a content provider;

determining, by the quality metric module, a quality metric of the keyword based on a historical click through rate of the advertisement;

evaluating, by the quality metric module, the quality metric to determine that the quality metric satisfies a quality metric threshold;

identifying, by the quality metric module, a first candidate keyword and a second candidate keyword using at least a portion of the keyword;

determining, by the quality metric module, a first value of a throttling parameter for the advertisement based on an advertisement budget, wherein the throttling parameter limits placement of the advertisement;

expanding, by the quality metric module responsive to the quality metric satisfying the quality metric threshold, placement criteria used to place the advertisement to include the keyword and a set of expansion keywords including at least one of the first candidate keyword and the second candidate keyword, wherein the expanding the placement criteria is expanded based on the first value of the throttling parameter;

determining an updated value for the throttling parameter based on a remaining advertising budget following delivery of the advertisement based on the expanded placement criteria; and reducing, by the quality metric module and based on the updated throttling parameter, the placement criteria used to place the advertisement to exclude at least one of the first candidate keyword or the second candidate keyword from the set of expansion keywords.

2. The method of claim 1, wherein the quality metric is based on a click through rate, further comprising:
determining the click through rate of the keyword corresponding to the advertisement.

3. The method of claim 1, further comprising:
determining the candidate keyword from at least one term of the keyword.

4. The method of claim 1, wherein the advertisement includes a media element, further comprising:
using the candidate keyword to identify a correlation between the advertisement and a web page; and
providing the media element for display with the web page responsive to the correlation.

5. The method of claim 1, wherein the advertisement is from a content group having a plurality of group content placement criteria including the keyword, further comprising:
determining the quality metric based on a click through rate of at least one of the group content placement criteria.

6. The method of claim 1, further comprising:
expanding the keyword to include the candidate keyword based on an evaluation of the throttling parameter.

7. The method of claim 1, further comprising:
obtaining a second candidate content placement criterion associated with the advertisement;
determining the throttling parameter of the advertisement, wherein the throttling parameter indicates a budget associated with placement of the advertisement on at least one web page;
determining that the budget fails to satisfy a budget threshold; and
excluding the second candidate content placement criterion from association with the advertisement.

8. The method of claim 1, further comprising:
determining the candidate keyword from the keyword.

9. The method of claim 1, further comprising:
determining that a budget associated with placement of the advertisement on at least one web page satisfies a budget threshold; and
associating the candidate keyword with the advertisement.

10. The method of claim 1, wherein the placement criteria includes the keyword and the candidate keyword, further comprising:
restricting the placement criteria to the keyword and the candidate keyword based on at least one of the quality metric of the keyword and the throttling parameter of the advertisement.

11. A system of providing information via a computer network, comprising:
a data processing system having at least one of a content placement module and a quality metric module executing on one or more processors that:
receives a keyword used to place an advertisement, the keyword received from a content provider;
determines a quality metric of the keyword based on a historical click through rate of the advertisement;
evaluates the quality metric to determine that the quality metric satisfies a quality metric threshold;
identifies a first candidate keyword and a second candidate keyword using at least a portion of the keyword;
determines a first value of a throttling parameter for the advertisement based on an advertisement budget, wherein the throttling parameter limits placement of the advertisement;
expands, responsive to the quality metric satisfying the quality metric threshold, placement criteria used to place the advertisement to include the keyword and a set of expansion keywords including at least one of the first candidate keyword and the second candidate keyword wherein the expanding the placement criteria is expanded based on the first value of the throttling parameter;
determines an updated value for the throttling parameter based on a remaining advertising budget following delivery of the advertisement based on the expanded placement criteria; and
reduces, based on the updated throttling parameter, the placement criteria used to place the advertisement to exclude at least one of the first candidate keyword or the second candidate keyword from the set of expansion keywords.

12. The system of claim 11, wherein the quality metric module determines a click through rate of the keyword corresponding to the advertisement.

13. The system of claim 11, wherein the advertisement includes a media element, the data processing system:
identifies a correlation between a web page and the advertisement using the candidate keyword; and
provides the media element for display with the web page responsive to the correlation.

14. The system of claim 11, wherein the advertisement is from a content group having a plurality of group content placement criteria including the keyword, the data processing system:
determines the quality metric based on a click through rate of at least one of the group content placement criteria.

15. The system of claim 11, wherein the data processing system:
expands the keyword to include the candidate keyword based on an evaluation of the throttling parameter.

16. The system of claim 11, wherein the data processing system: determines the candidate keyword from the keyword.

17. A computer readable storage medium having instructions to provide information on a computer network, the instructions comprising instructions to:
receive a keyword used to place an advertisement, the keyword received from a content provider;
determine a quality metric of the keyword based on a historical click through rate of the advertisement;
evaluate the quality metric to determine that the quality metric satisfies a quality metric threshold;
identify a first candidate keyword and a second candidate keyword using at least a portion of the keyword;
determine a first value of a throttling parameter for the advertisement based on an advertisement budget, wherein the throttling parameter limits placement of the advertisement;
expand, responsive to the quality metric satisfying the quality metric threshold, placement criteria used to place the advertisement to include the keyword and a set of expansion keywords including at least one of the first candidate keyword and the second candidate keyword wherein the expanding the placement criteria is expanded based on the first value of the throttling parameter;
determine an updated value for the throttling parameter based on a remaining advertising budget following delivery of the advertisement based on the expanded placement criteria; and
reduce, based on the updated throttling parameter, the placement criteria used to place the advertisement to exclude at least one of the first candidate keyword or the second candidate keyword from the set of expansion keywords.

18. The computer readable storage medium of claim 17, wherein the quality metric is based on a click through rate, the instructions further comprising instructions to determine a click through rate of the keyword corresponding to the advertisement.

19. The computer readable storage medium of claim 17, the instructions further comprising instructions to determine the candidate keyword from the keyword.

20. The computer readable storage medium of claim 17, the instructions further comprising instructions to:
expand the keyword to include the candidate keyword based on an evaluation of the throttling parameter.

* * * * *